(12) United States Patent　　　　　(10) Patent No.:　US 12,599,985 B2

Rozmarynowski et al.　　　　　(45) Date of Patent:　　Apr. 14, 2026

(54) BATTERY POWERED WELDING SYSTEM

(71) Applicant: Illinois Tool Works Inc., Glenview, IL (US)

(72) Inventors: Scott Ryan Rozmarynowski, Greenville, WI (US); Caleb Robert Krisher, Appleton, WI (US); Darrell Lee Sickels, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/436,475

(22) Filed: Feb. 8, 2024

(65) Prior Publication Data

US 2024/0173790 A1　　May 30, 2024

Related U.S. Application Data

(63) Continuation of application No. 16/990,509, filed on Aug. 11, 2020, now Pat. No. 11,897,064, which is a continuation of application No. 13/176,593, filed on Jul. 5, 2011, now Pat. No. 10,737,348.

(60) Provisional application No. 61/363,075, filed on Jul. 9, 2010.

(51) Int. Cl.
B23K 9/32　　　　(2006.01)

(52) U.S. Cl.
CPC ................................... B23K 9/327 (2013.01)

(58) Field of Classification Search
CPC ....... B23K 3/063; B23K 9/327; B23K 9/1081
USPC ......................................................... 219/74
See application file for complete search history.

(56) References Cited

U.S. PATENT DOCUMENTS

| | | | | |
|---|---|---|---|---|
| 5,278,390 | A * | 1/1994 | Blankenship | ........ B23K 9/0953 |
| | | | | 219/125.1 |
| 5,410,126 | A | 4/1995 | Miller | |
| 6,066,834 | A | 5/2000 | Rebold | |
| 6,479,795 | B1 | 11/2002 | Albrecht | |
| 6,577,024 | B2 | 6/2003 | Kikuta | |
| 6,818,860 | B1 | 11/2004 | Stava | |
| 7,423,238 | B2 | 9/2008 | Stanzel | |
| 2003/0164645 | A1 | 9/2003 | Crandell, III | |
| 2003/0217998 | A1 | 11/2003 | Reynolds | |

(Continued)

FOREIGN PATENT DOCUMENTS

| | | |
|---|---|---|
| EP | 1247609 A2 | 10/2002 |
| WO | 200609633 | 8/2006 |

OTHER PUBLICATIONS

Int'l Search Report and Written Opinion Appln No. PCT/US2011/043452 mailed Oct. 17, 2011.

*Primary Examiner* — Chris Q Liu
*Assistant Examiner* — James F Sims, III
(74) *Attorney, Agent, or Firm* — McAndrews, Held & Malloy, Ltd.

(57)　　　　　　ABSTRACT

A battery powered welding system is provided. In one welding system a battery powered welder includes control circuitry configured to control a welding power output converted from power from an external battery power source. The battery powered welder also includes a wire drive assembly coupled to the control circuitry and configured to feed a welding wire using power from the external battery power source. The battery powered welder includes a case integrally supporting and enclosing the control circuitry and the wire drive assembly. The case is not configured to enclose the external battery power source.

20 Claims, 4 Drawing Sheets

(56)          References Cited

U.S. PATENT DOCUMENTS

| | | | |
|---|---|---|---|
| 2005/0061791 | A1 | 3/2005 | Matus |
| 2005/0199606 | A1 | 9/2005 | Enyedy |
| 2005/0279742 | A1* | 12/2005 | Stava ................... B23K 9/1043 |
| | | | 219/130.1 |
| 2006/0169685 | A1 | 8/2006 | Stanzel |
| 2006/0196862 | A1 | 9/2006 | Sickels |
| 2007/0181547 | A1 | 8/2007 | Vogel |
| 2007/0187376 | A1 | 8/2007 | Albrecht |
| 2008/0053967 | A1 | 3/2008 | Moore |
| 2008/0083705 | A1 | 4/2008 | Peters |
| 2008/0116176 | A1* | 5/2008 | Ulrich ................. B23K 9/1087 |
| | | | 219/137 R |
| 2009/0057285 | A1 | 3/2009 | Bashore |
| 2009/0277881 | A1 | 11/2009 | Bornemann |
| 2010/0051596 | A1 | 3/2010 | Diedrick |
| 2011/0049116 | A1 | 3/2011 | Rappl |

* cited by examiner

BATTERY POWERED WELDING SYSTEM

CROSS REFERENCE TO RELATED APPLICATIONS

This application is a Non-Provisional Patent Application of U.S. Provisional Patent Application No. 61/363,075 entitled "Battery Powered Welder", filed Jul. 9, 2010, which is herein incorporated by reference.

BACKGROUND

The invention relates generally to welding systems and, more particularly, to a battery powered welding system.

Welding is a process that has become increasingly ubiquitous in various industries and applications. Portable welding systems may be used in field applications where it is not practical or convenient to send a work piece to a welding shop for repair or fabrication. One specific group of portable welders is designed for light or occasional welding applications (low output requirements of about 200 amps or less), and is well suited for shops and garages where only single-phase power is available. These welders find applications in the farming and ranching industry; off-road applications; the food and beverage industry; restaurant and kitchen repair; petroleum and chemical fabrication; shipboard installation and repair; and many other maintenance and repair applications. Certain configurations of these systems may be suitable for use in remote or difficult to reach areas, and may be vehicle-based or designed to be permanently or temporarily carried and/or connected to a vehicle.

Certain portable welding systems utilize one or more internal batteries, resulting in increased cost and weight when compared to portable systems that do not include a battery. Furthermore, for metal inert gas (MIG) and similar welding processes, some welding systems utilize a spool gun or torch, on which a small spool of welding wire is mounted and fed to a welding tip during the welding process. While generally effective, such systems are difficult or unwieldy in weld in locations with limited clearance. In addition, some battery powered portable welding systems do not include welding output control, making use of quite primitive techniques for establishing and maintaining welding arcs, substantially reducing control of output power and limiting both the applicability of the systems and the quality of resulting welds. There is a need in the field for a system that overcomes such disadvantages.

BRIEF DESCRIPTION

In an exemplary embodiment, a battery powered welder includes control circuitry configured to control a welding power output converted from power from an external battery power source. The battery powered welder also includes a wire drive assembly coupled to the control circuitry and configured to feed a welding wire using power from the external battery power source. The battery powered welder includes a case integrally supporting and enclosing the control circuitry and the wire drive assembly. The case is not configured to enclose the external battery power source.

In another embodiment, a battery powered welding system includes a case comprising a storage area configured to support and enclose the welding system and a MIG torch for performing a welding operation. The battery powered welding system also includes control circuitry configured to control a welding power output converted from power from an external battery power source. The battery powered welding system includes a wire drive assembly coupled to the control circuitry and configured to feed a welding wire using power from the external battery power source. The case is not configured to enclose the external battery power source.

In another embodiment, an externally powered welder includes a welding power converter configured to receive power from an external power source. The externally powered welder also includes a weld output controller configured to control welding power output of the welding power converter and a wire drive controller configured to control a wire drive assembly. The welding power converter, the weld output controller, and the wire drive controller are configured to be installed in an externally powered welder housing and the housing is not configured to enclose the external power source.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
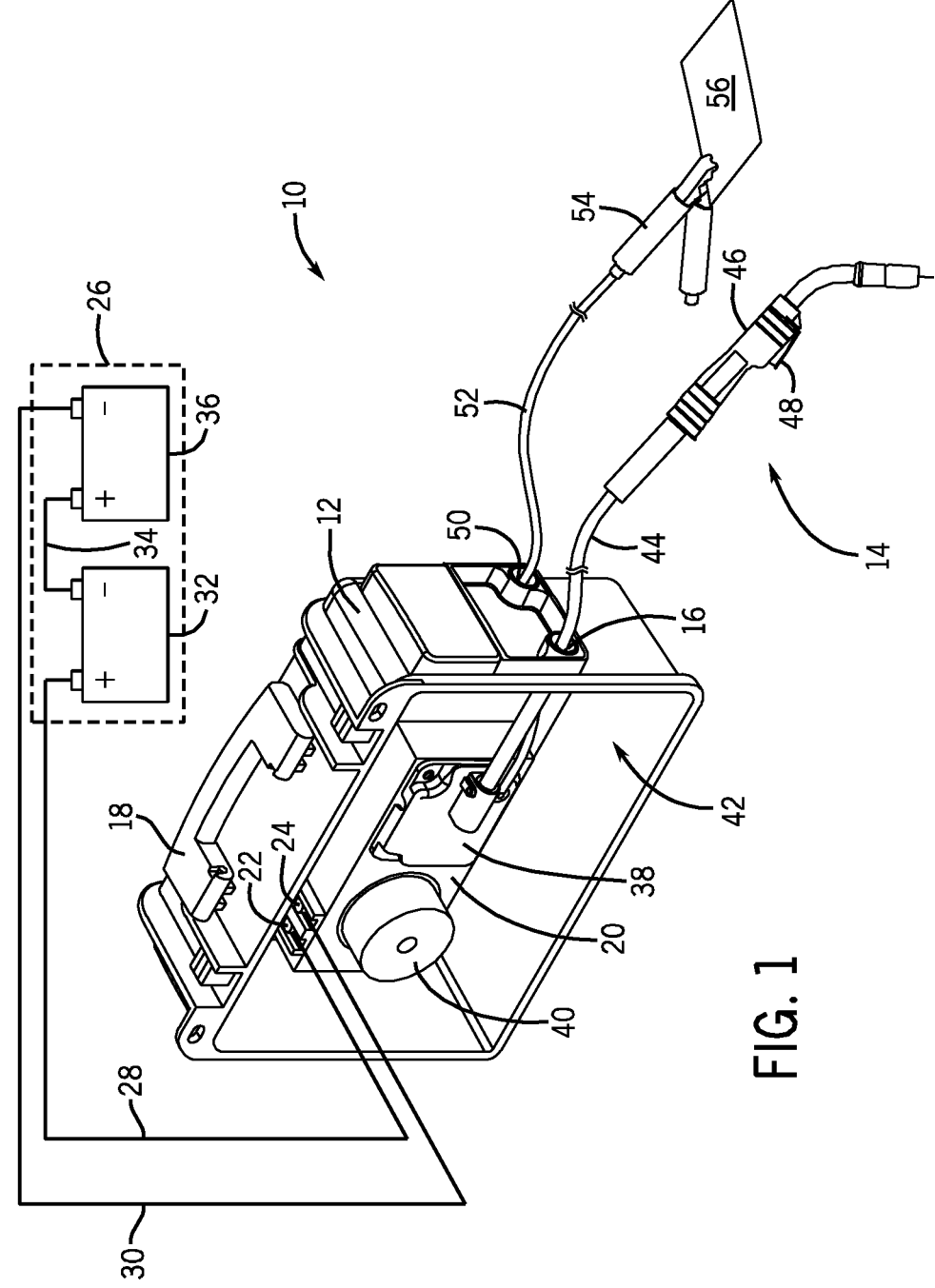
FIG. 1 is a perspective view of an exemplary embodiment of a welding system employing a portable battery powered welder.

FIG. 1 is a perspective view of an embodiment of a welding system 10 employing a portable battery powered welder 12. A torch assembly 14 is coupled to the welder 12 through an opening or slot 16 to provide welding consumables for a welding operation. The illustrated portable battery powered welder 12 includes a handle 18 for easily transporting the welding system 10. Control circuitry 20 is mounted inside the welder 12 and controls the operation of the welder 12. The control circuitry 20 controls power conversion circuitry, a wire drive controller, and may include functionality (e.g., via stored and executed code) for regulating weld output, shielding gas flow (if shielding gas is used in the welding process), fan speed, and so forth. The control circuitry 20 receives power from one or more external batteries coupled across terminals 22 and 24. In certain configurations, the control circuitry 20 receives power from two external batteries coupled across terminals 22 and 24.

As illustrated, an external power source 26 includes a positive terminal coupled to terminal 22 via a battery cable 28 and a negative terminal coupled to terminal 24 via a battery cable 30. Furthermore, the external power source 26 includes a first battery 32 coupled via a cable 34 to a second battery 36. However, in certain embodiments, the external power source 26 may include fewer or more than the two illustrated batteries 32 and 36. As may be appreciated, the batteries 32 and 36 may be any suitable voltage. For example, in certain embodiments, the batteries 32 and 36 may each be 12 volt batteries. Therefore, with the batteries 32 and 36 configured in series, as illustrated, 24 volts may be provided to the welding system 10 for performing a welding operation. In certain embodiments, the external power source 26 may provide 36 volts, or any other suitable voltage. Other connection schemes may be employed, such as parallel connected batteries, or both series and parallel connections, depending upon the voltage, current and power needs and the design of power conversion circuitry (discussed below). Furthermore, in certain configurations, the external power source 26 may receive power from a source other than batteries. For example, the external power source 26 may receive power from a stick welder, a welder/ generator, or a MIG welder.

Figure 3:
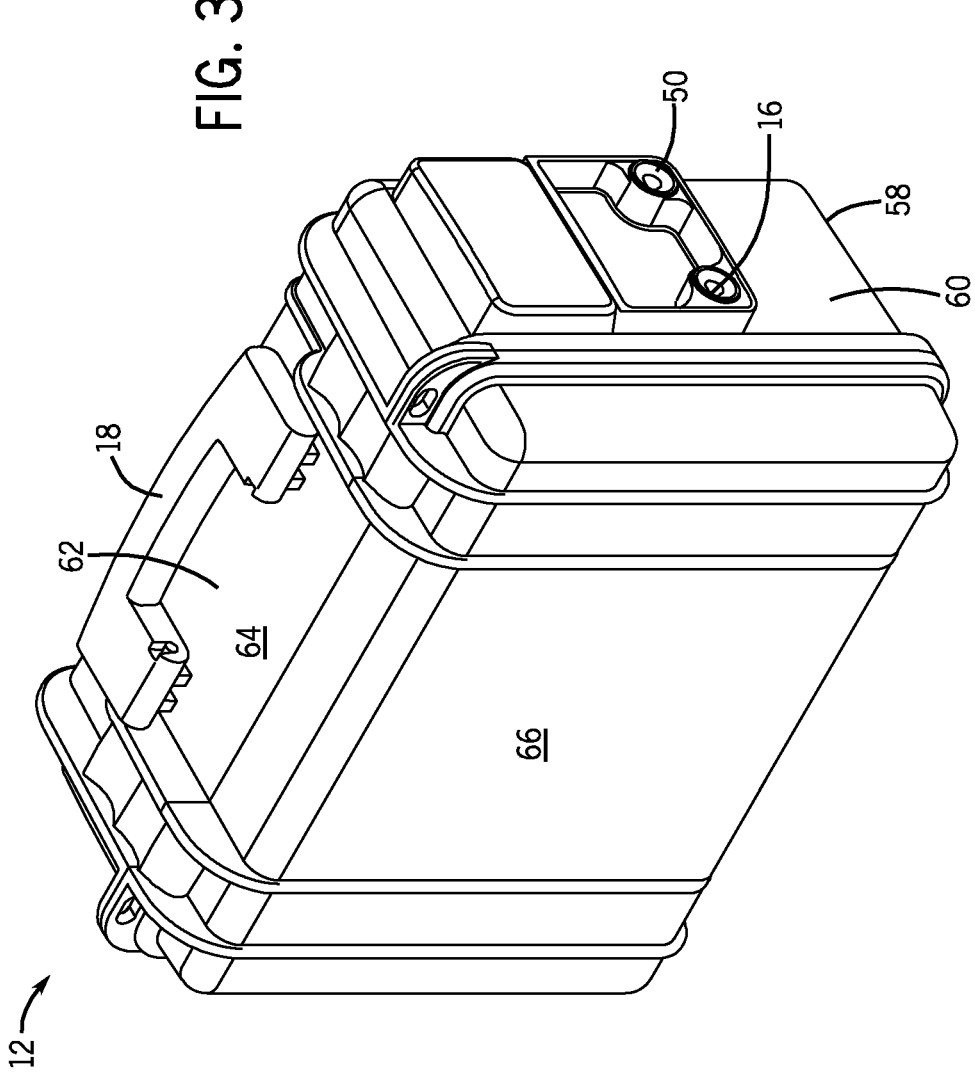
FIG. 3 is a perspective view of an exemplary embodiment of a portable battery powered welder.

The portable battery powered welder 12 includes a wire drive system 38 (i.e., wire drive assembly) mounted to the control circuitry 20 and communicatively coupled to the control circuitry 20. The wire drive system 38 causes rollers to rotate to feed wire from a wire spool 40 to the torch assembly 14 for a welding operation. The wire spool 40 is rotatably mounted to the control circuitry 20 to enable the spool 40 to rotate and provide wire. A storage area 42 surrounds the control circuitry 20, the wire drive system 38, and the wire spool 40 and allows various portions of the welding system 10 to be stored, enclosed, and transported within the case of the welder 12. For example, the torch assembly 14 and the battery cables 28, 30, and 34, may be stored, enclosed, and transported within the case of the welder 12. However, the external power source 26 is not enclosed within the case of the welder 12. As may be appreciated, when the welder 12 is enclosed, transported, or stored, an additional portion of the case (specifically, a shell or cover) not illustrated in FIG. 1 is connected to the portion of the case illustrated in FIG. 1 to completely enclose and support the control circuitry 20, the wire drive system 38, the wire spool 40, and other items within the welder 12 (e.g., welding cables, torch, etc). The assembled case is illustrated in FIG. 3. In certain embodiments, the external power source 26 may include batteries from a motor vehicle, such as a truck or utility vehicle. It should be noted, that when batteries from a motor vehicle are used for the external power source 26, the batteries should generally be disconnected from the vehicle prior to use in a welding operation. In other embodiments, an operator supplies separate batteries to form the external power source 26.

The torch assembly 14 includes a weld cable 44 coupled to a welding torch 46. As illustrated, the welding torch 46 is a metal inert gas (MIG) welding torch, however, in certain embodiments, other welding torches may be coupled to the weld cable 44. The welding torch 46 includes a trigger 48 for initiating a welding operation. The portable battery powered welder 12 also includes an opening or slot 50 where a work cable 52 may extend through to be coupled to the welder 12. A clamp 54 is attached to the work cable 52 and is clamped onto a workpiece 56, as illustrated. Thus, the cables 44 and 52 may be directly coupled to the wire drive system 38 or the control circuitry 20 and enable an electric current to flow through the torch 46 to form a welding arc between the welding torch 46 and the workpiece 56. As may be appreciated, the weld cable 44 and the work cable 52 may extend through the openings 16 and 50 as illustrated. In other embodiments, the cables 44 and 52 may extend through fewer or more openings or slots. Furthermore, the openings 16 and 50 may be positioned in other locations and may vary from the shape and/or size depicted.

Figure 2:
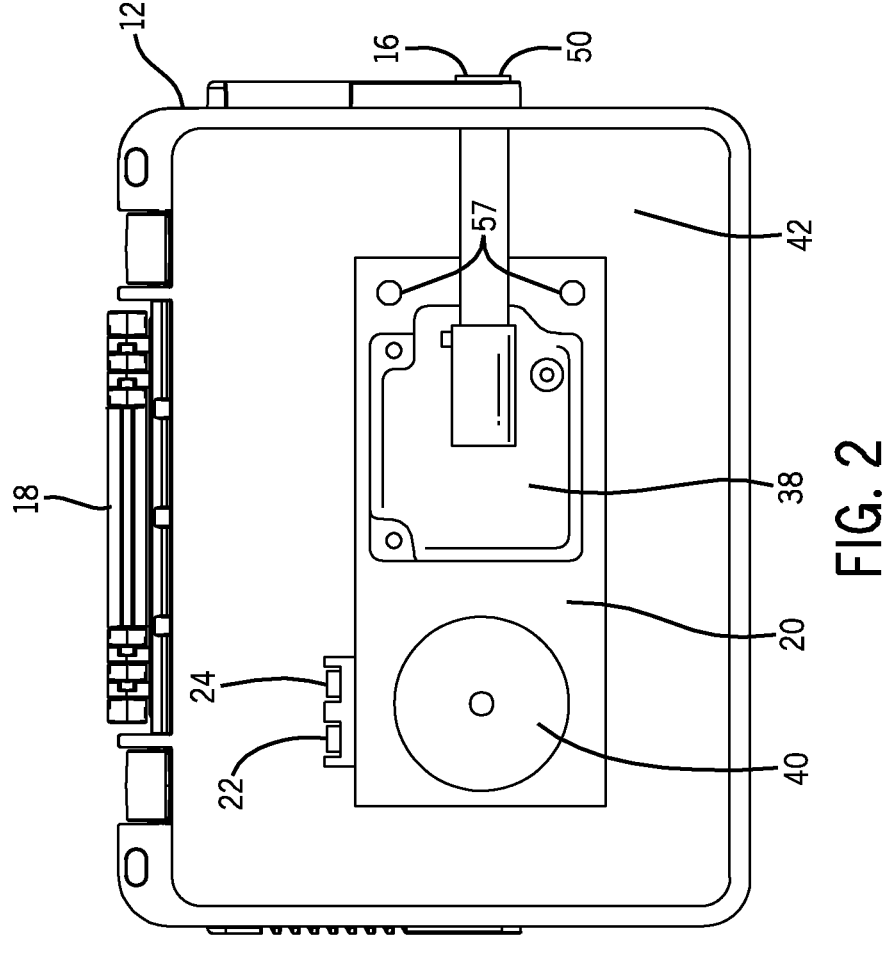
FIG. 2 is a side view of the welding system of FIG. 1.

FIG. 2 is a side view of the welding system 10 of FIG. 1. This view illustrates the welding system 10 without the torch assembly 14, work cable 52, and battery cables 28 and 30 coupled to the system 10 and demonstrates that such cables and devices may be removed from the system for storage and transportation. Furthermore, the storage area 42 is clearly shown around the control circuitry 20, the wire drive system 38, and the wire spool 40. As previously described, the storage area 42 may be used to store various portions of the welding system 10, including cables, welding torch, etc. As may be appreciated, the control circuitry 20 may include various control inputs 57 (e.g., user interface, knobs, dials, etc.) to set various welding parameters.

As may be appreciated, FIGS. 1 and 2 only illustrate one side of the enclosure of the welder 12, while FIG. 3 illustrates the complete enclosure. Specifically, FIG. 3 is a perspective view of an embodiment of a portable battery powered welder 12. The portable battery powered welder 12 includes a case, portable enclosure, or shell 58 having a front side 60, a top side 62, a right side 64, and a left side 66. The case 58 may be made from a lightweight, impact resistant, and flame retardant material, for example, a polymer. The case 58 is not limited to this type of material and may also be made, in whole or in part, from other structural materials, such as metal alloys or composite material.

The work cable opening 50 enables an operator to couple a work cable and clamp to the portable battery welder 12. Likewise, the welding torch opening 16 enables an operator to couple a welding torch to the portable battery powered welder 12. Further, openings 16 and 50 enable a closed-loop circuit between a work piece and the portable battery powered welder 12 to perform a welding operation. As previously described, the battery cables, the welding torch, the welding torch cable, and the work cable may be stored within the case 58. As a complete system, the welder 12 may be lightweight, thus allowing the welder 12 to be easily transported. In certain embodiments, the welder 12 with a welding torch and cables may weigh approximately 28 pounds, while, in other embodiments, the weight of the welder 12 may vary.

Figure 4:
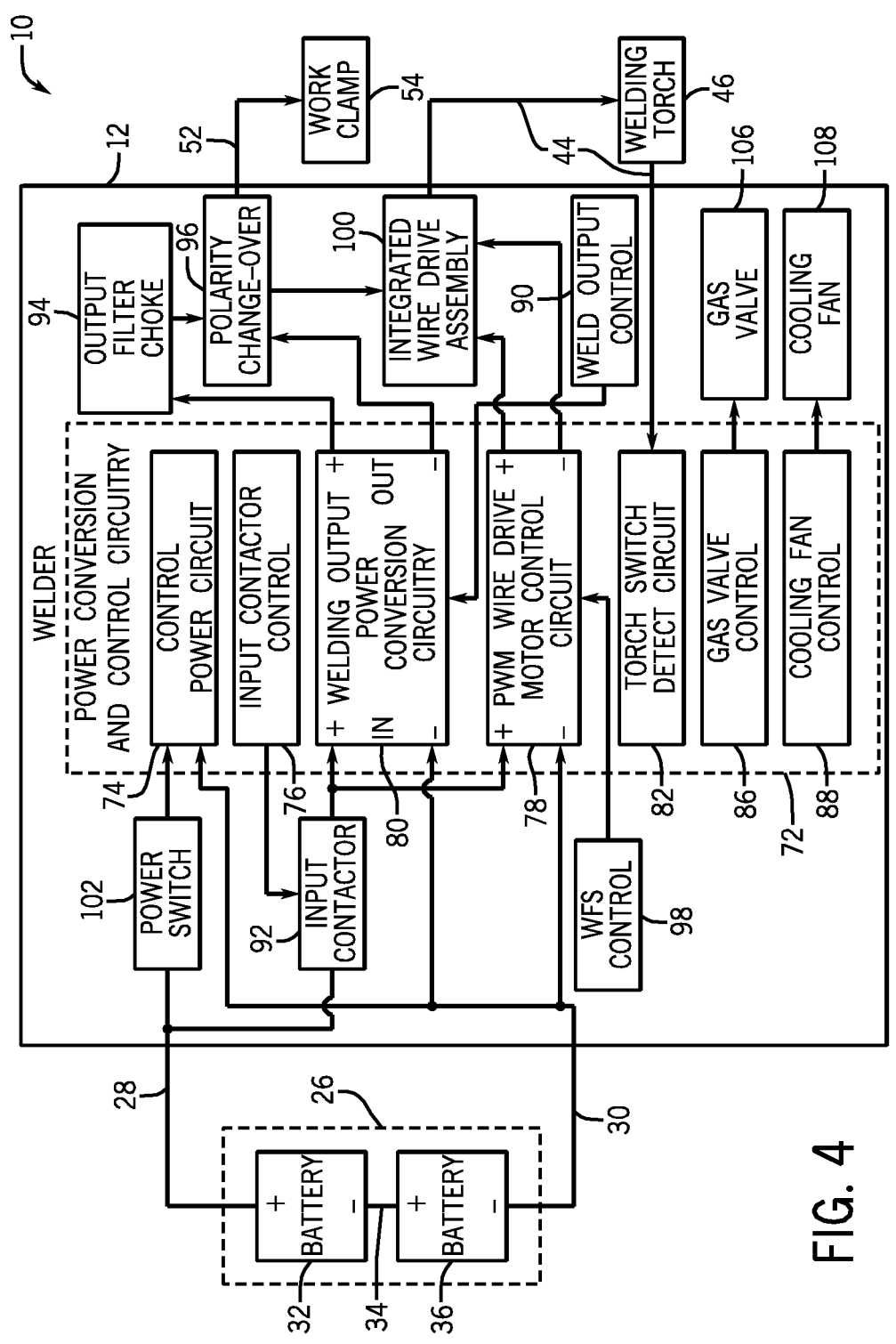
FIG. 4 is a schematic diagram of an exemplary embodiment of a welding system employing a portable battery powered welder.

FIG. 4 is a schematic diagram of an exemplary embodiment of a welding system 10 employing a portable battery powered welder 12. The welder 12 includes power conversion and control circuitry 72 configured to control the functions of the welder 12, to convert power from the external power source 26 to a welding power output to be supplied to the welding torch 46, and to control the welding power output. The power conversion and control circuitry 72 may include a control power circuit 74, an input contactor control 76, a PWM wire drive motor control circuit 78, a power conversion circuitry 80, a torch switch detect circuit 82, a gas valve control 86, and a cooling fan control 88.

The control power circuit 74 may control the operational power within the welder 12, while the power conversion circuit 80 converts power from the external power source 26 to weld output power for a welding operation. The power conversion circuitry 80, which may include a buck regulator circuit, allows the power conversion and control circuitry 72 to regulate the weld output power based on a reference level selected by an operator via a weld output control 90. The weld output control 90 includes an adjustable device, such as a potentiometer, that is adjusted by the operator (e.g., via a knob or user interface) to provide the reference level (i.e., control signal) to the power conversion circuitry 80 and to set the weld output power. In certain embodiments, the input contactor control 76 is configured to provide a regulated voltage signal (e.g., 12 VDC) to a coil of an input contactor 92 to energize the coil and to remove the signal from the coil of the input contactor 92 to de-energize the coil. When the coil of the input contactor 92 is energized, power from the external power source 26 may flow through the contactor 92 to the power conversion circuitry 80 and the PWM wire drive motor control circuit 82. When the coil of the input contactor 92 is de-energized, welding power is inhibited from flowing to the welding torch 46.

An output filter choke 94 coupled to the power conversion circuitry 80 may include an inductor and may smooth current flow to a welding arc. The welder also includes a polarity change-over device 96 coupled to the output filter choke 94. The polarity change-over device 96 is a mechanical linking assembly that enables the polarity of the work clamp cable 52 and the welding torch cable 44 to be reversed. For example, when welding with a tubular flux-cored wire (i.e., self-shielding), the welding torch 46 is linked by the device 96 to use a negative polarity. Conversely, when welding with solid wire and using shielding gas, the welding torch 46 is linked by the device 96 to use a positive polarity.

The PWM wire drive motor control 78 is a pulse-width modulated regulator circuit that allows the power conversion and control circuitry 72 to regulate the wire drive motor voltage based on a reference level set by a wire feed speed (WFS) control 98. The wire drive motor voltage controls the wire drive motor speed, thereby controlling the amount of wire provided to a welding operation. The WFS control 98 includes an adjustable device, such as a potentiometer, that is adjusted by an operator (e.g., via a knob or user interface) to provide a reference level to the PWM wire drive motor control 78 and to set the wire drive motor speed. Specifically, the PWM wire drive motor control 78 provides control signals to an integrated wire drive assembly 100 that is communicatively coupled to the wire drive motor control 78. The wire drive assembly 100 includes a wire drive motor, wire feed rollers, and a wire feed roller tensioner. In particular, the wire drive motor converts a signal from the wire drive motor control 78 to mechanical energy to turn one or more wire feed rollers. The wire feed rollers are cylindrical metal objects that are used to push the welding wire toward the welding torch 46. The wire feed roller tensioner is a spring-based knob that enables a variable pressure to be applied to the wire feed rollers to adjust the pinching force applied to the welding wire.

A power switch 102 switches power to the control power circuit 74 on or off, thereby enabling or disabling whether power is provided to the welder 12. The welding torch 46 includes a torch switch (i.e., trigger) to control the start and stop of a welding operation. When the torch switch is actuated, the torch switch detect circuit 80 receives a signal indicating that the torch switch is actuated and in response sends signals to other power conversion and control circuitry 72 devices to initiate a welding operation.

In certain embodiments, the gas valve control 86 includes circuitry to energize a coil on a gas valve 106 when the welding torch 46 trigger is pressed. When the coil is energized, shielding gas flows to the welding torch 46. When the welding torch 46 trigger is released, the gas valve 106 coil is de-energized. The fan control circuit 88 regulates the voltage applied to a cooling fan 108 which cools the power conversion and control circuitry 72 by dissipating heat generated by the circuitry 72. For example, if no voltage is supplied to the cooling fan 108, the cooling fan 108 will not provide air flow across the circuitry 72. Furthermore, as the voltage applied to the cooling fan 108 increases, the speed of the cooling fan 108 may increase, therefore increasing the speed of air flow across the power conversion and control circuitry 72.

As described herein, the portable battery powered welder 12 provides a welding system 10 that is easily transportable. The welder 12 may be moved between locations and quickly configured for performing welding operations. When welding operations are complete, the system 10 may be stored within the case of the welder 12. By using an external power source, certain embodiments of the welder 12 may be anywhere from approximately 20 to 50 percent lighter than systems including an internal battery, while in other embodiments the weight of the welder 12 may vary. Furthermore, the integrated wire feeding system within the welder 12 enables the use of a MIG torch. Therefore, welding operations may be performed in areas with low clearance around the welding torch.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A battery powered welder comprising:
   control circuitry configured to control a welding power output converted from power from an external battery power source;
   a wire drive assembly comprising a wire drive motor and one or more wire feed rollers, the wire drive assembly communicably coupled to the control circuitry and configured to feed a welding wire using power from the external battery power source;
   a wire feed speed control circuitry configured to generate one or more signals to regulate a voltage in the wire drive motor based on a reference wire feed speed level; and
   a case comprising a storage area within the case, the control circuitry, the wire drive assembly, and the wire feed speed control circuitry being enclosed by the case within the storage area, and the external battery power source not being enclosed by the case, the storage area configured to store at least one of a welding torch assembly, a work cable, or a battery cable within the storage area with the control circuitry, the wire drive assembly, and the wire feed speed control circuitry.

2. The welder of claim 1, wherein the control circuitry comprises a pulse width modulated weld output controller configured to control the welding power output.

3. The welder of claim 1, wherein the wire feed speed control circuitry comprises at least one of:
   a pulse width modulation wire drive control circuit configured to generate the one or more signals to regulate the voltage in the wire drive motor; or
   a linear driven wire drive control circuit configured to generate the one or more signals to regulate the voltage in the wire drive motor.

4. The welder of claim 1, wherein the control circuitry comprises a fan controller configured to control the operation of a cooling fan, the cooling fan being within the storage area.

5. The welder of claim 1, comprising a cooling fan configured to aid in dissipating heat generated by the control circuitry.

6. The welder of claim 1, comprising a gas valve configured to control the flow of gas to the welding torch assembly.

7. The welder of claim 1, wherein the wire feed speed control circuitry is configured to receive a control signal from at least one of: a wire feed speed control device; or a user interface.

8. An externally powered welding system comprising:
   a MIG torch for performing a welding operation;

control circuitry configured to control a welding power output converted from power from an external power source;

a wire drive assembly comprising a wire drive motor and one or more wire feed rollers, the wire drive assembly communicably coupled to the control circuitry and configured to feed a welding wire using power from the external power source;

a wire feed speed control circuitry configured to generate one or more signals to regulate a voltage in the wire drive motor based on a reference wire feed speed level; and a case comprising a storage area within the case, the control circuitry, the wire drive assembly, and the wire feed speed control circuitry being enclosed by the case within the storage area, and the external battery power source not being enclosed by the case, the storage area configured to store at least one of the MIG torch, a work cable, or a battery cable within the storage area with the control circuitry, the wire drive assembly, and the wire feed speed control circuitry.

9. The system of claim 8, further comprising weld cable configured to couple to the MIG torch.

10. The system of claim 8, further comprising the battery cable, the battery cable configured to couple the control circuitry to one or more batteries of the external battery power source.

11. The system of claim 8, further comprising a user interface configured to output a user interface signal, wherein the control circuitry is configured to determine the reference wire feed speed level based on the user interface signal.

12. The system of claim 8, wherein the wire feed speed control circuitry comprises at least one of:

a pulse width modulation weld output control circuit configured to generate the one or more signals to regulate the voltage in the wire drive motor; or a linear driven wire drive control circuit configured to generate the one or more signals to regulate the voltage in the wire drive motor.

13. An externally powered welder comprising:

a welding power converter configured to receive power from an external battery power source;

a weld output controller configured to control welding power output of the welding power converter;

a wire drive controller configured to generate one or more signals to regulate a voltage in a wire drive motor based on a reference wire feed speed level; and a case comprising a storage area within the case, the welding power converter, the weld output controller, the wire drive controller, and the wire drive motor being enclosed by the case within the storage area, and the external battery power source not being enclosed by the case, the storage area configured to store at least one of the MIG torch, a work cable, or a battery cable within the storage area with the welding power converter, the weld output controller, the wire drive controller.

14. The welder of claim 13, comprising a fan controller configured to control the operation of a cooling fan.

15. The welder of claim 13, comprising a gas valve controller configured to control the operation of a gas valve.

16. The welder of claim 13, wherein the weld output controller is configured to receive a control signal from a weld output control device.

17. The welder of claim 13, wherein the wire drive controller is configured to receive a control signal from a wire feed speed control device.

18. The welder of claim 13, further comprising a switch detection circuit configured to detect when a welding torch trigger is actuated.

19. The welder of claim 13, wherein the wire drive controller comprises at least one of:

a pulse width modulation wire drive control circuit configured to generate the one or more signals to regulate the voltage in the wire drive motor; or a linear driven wire drive control circuit configured to generate the one or more signals to regulate the voltage in the wire drive motor.

20. The welder of claim 13, further comprising a wire drive assembly comprising the wire drive motor and one or more wire feed rollers, the wire drive assembly communicably coupled to the wire drive controller and configured to feed a welding wire using power from the external power source.

* * * * *